United States Patent Office 3,676,296
Patented July 11, 1972

3,676,296
NUCLEAR REACTOR WITH SECONDARY SHUT DOWN CONTROL ROD
David Lees Linning and Charles Brian Cowking, Warrington, England, assignors to United Kingdom Atomic Energy Authority, London, England
Filed Nov. 3, 1969, Ser. No. 873,438
Claims priority, application Great Britain, Dec. 20, 1968, 60,866/68
Int. Cl. G21c 7/08
U.S. Cl. 176—35      2 Claims

ABSTRACT OF THE DISCLOSURE

Secondary shut down equipment for a liquid metal cooled fast nuclear reactor. The reactor is of the type comprising a core structure having a central active region, the core structure being supported on a diagrid within a vessel containing the liquid metal coolant. Control rod tubes extend vertically above, through and below the active region of the core structure. Normal control rods operate in the parts of the control rod tubes above the core structure. The secondary shut down equipment comprises a rigid absorber element in the lower end of each control rod tube below the active region of the core structure. The absorber elements are insertable into the active region of the core structure by compression springs which are held in a compressed state within the lower end of the control rod tube by the absorber element. Hold down of the absorber element is by differential pressure existing between liquid metal coolant in the control rod tube above and below a flange on the absorber element which seals with the wall of the control rod tube.

BACKGROUND OF THE INVENTION

This invention relates to nuclear reactors, and in particular to equipment for achieving shut-down of a nuclear reactor.

In several kinds of nuclear reactor, shut-down is brought about by employing some or all of the control rods normally employed for adjusting the power level of the reactor. In other kinds of nuclear reactor, some control rods are employed solely for shut-down purposes, whilst other control rods are used for power level control. In the latter case, the shut-down rods generally operate in the same manner as the power level control rods, although it is generally arranged that for a controlled shut-down which can be achieved at leisure, normal operation is employed for fully inserting the shut-down rods into the reactor core, whereas for an emergency shut-down, a speedier insertion or a free fall under gravity is used to achieve a faster shut-down. It is recognised that a severe power excursion may damage or distort the reactor core to an extent which would prevent any of the control rods from being inserted in the core, although in designing the reactor, steps are taken to minimise this risk as much as possible. However, it has been thought necessary in some cases to provide shut-down equipment which operates on entirely different principles and which is designed to operate effectively even if severe core distortion had occurred, ball shut-down devices are an example.

The provision of control and shut-down expedients is made more complicated in the case of that kind of reactor which has a shield above or below the core and which is rotatable relative to the core axis for the purpose of refuelling the core, because the mechanism for operating control rods needs to be provided outside the shield so as to be accessible for maintenance whereas the connections between the mechanism and the actual control rods associated with the core must penetrate the shield. Rotation of the shield destroys the alignment between the mechanism sites and the core channels in which the rods operate; consequently such reactors invariably have releasable connections between mechanism and rods, and refuelling operations involving rotating the shield take place only when the control rods are fully inserted in the core and the said connections are released, that is, the reactor is refuelled when shut-down. An example of this kind of reactor is the Prototype Fast Reactor (P.F.R.) now being constructed at Dounreay, Scotland and generally described for example in Paper 3/3 by Frame et al. and Paper 5A/5 by Evans et al. presented at the British Nuclear Energy Society's London Conference on Fast Breeder Reactors, May, 17–18, 1966.

It is an object of the present invention to provide, in a reactor of the kind hereinbefore last-described, equipment for shutting down the reactor which will be relatively unaffected by core damage or distortion, and is independent of the angular position of the rotating shield.

SUMMARY OF THE INVENTION

According to the invention, in a nuclear reactor having a shield adjacent one end of the reactor core and mounted for rotation relative to the core, there being a plurality of fixed tubes penetrating the reactor core but not said shield and in which tubes control rods for normal control and shut-down are axially movable by means disposed on the outside of said shield, additional shut-down equipment comprises a shut-down absorber element axially movable in each of at least some of said tubes, each element being normally disposed in a part of the respective tube which extends beyond the core boundary at that end of the core which is remote from the rotatable shield, means for inserting each said element into register with said core for shutting-down the reactor by causing movement of each said element within the respective tube in the opposite direction to that of inserting the normal control rods into the core, and means for operating said inserting means, said operating means being disposed outside said core boundary and out of axial register with said rotatable shield.

The said means for inserting each said element are preferably constituted by compression spring means disposed in each said tube part for operation on each said absorber element for inserting the latter into the reactor core, and releasable holding means for normally holding said compression spring means in a compressed or "cocked" state, said holding means being operable by said operating means for releasing said compression spring means.

The said releasable holding means may be constituted by sealing engagement between each said absorber element and a portion of the respective fixed tube part, a source of low pressure disposed outside said core boundary and out of register with said shield, pipework connecting said tube part to said source of low pressure, and a fluid occupying said pipework and said tube part as far as said sealing engagement, whereby during normal operation of the reactor, the low pressure applied to said fluid is sufficient to hold said element in said sealing engagement and thereby keep said compression spring means in its compressed state, whereas release of said low pressure by said operating means allows the spring means to expand and insert the element into its core-registering position.

Where the rotatable shield is disposed above the reactor core, said tube parts are preferably disposed beneath the core, and the said elements are insertable upwardly into the core from beneath.

DESCRIPTION OF THE DRAWINGS

A constructional example embodying the invention will now be described with reference to the accompanying diagrammatic drawings, wherein.

DESCRIPTION OF THE PREFERRED EMBODIMENT

Figure 1:
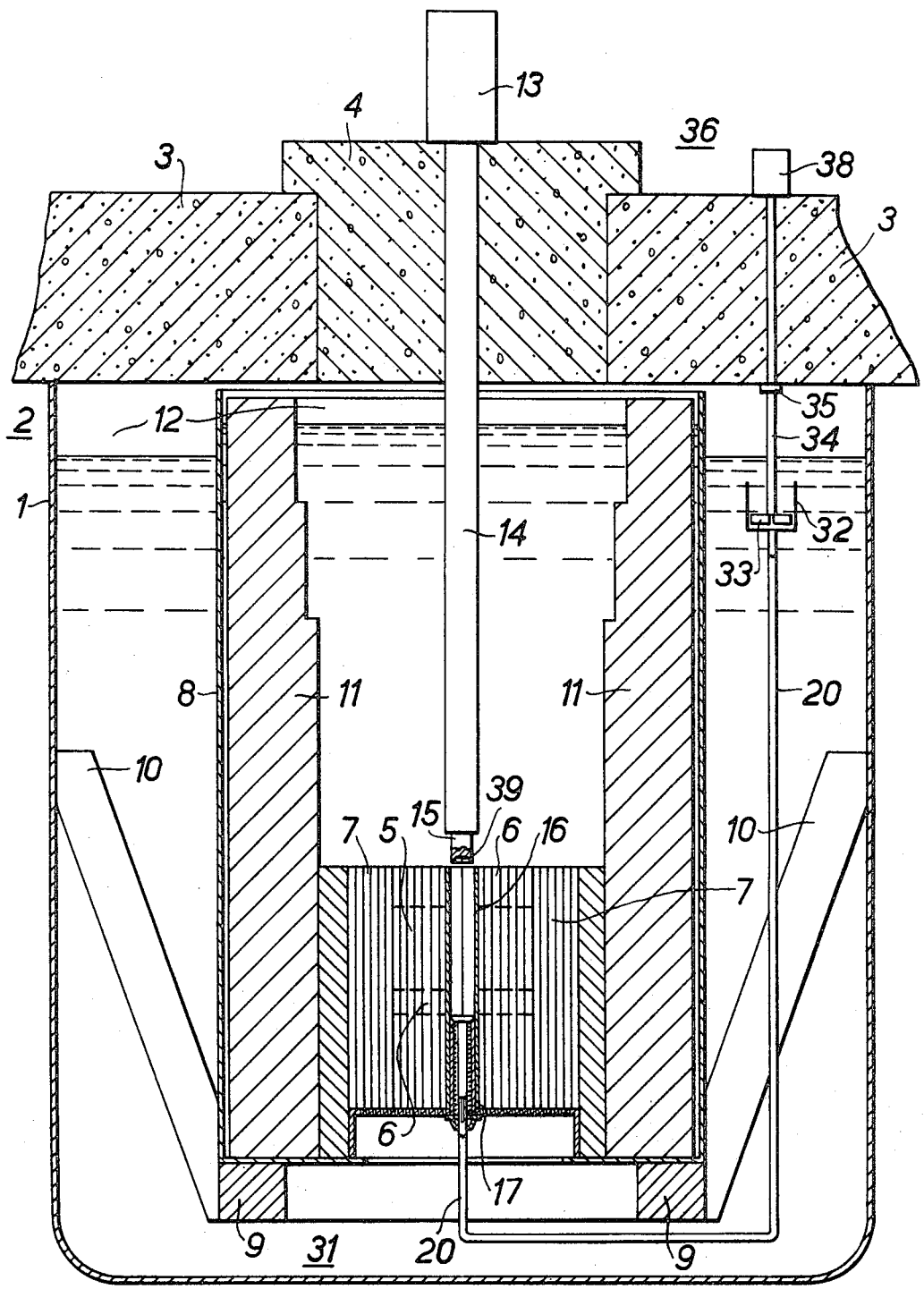
FIG. 1 is a side view in medial section of part of a reactor installation.

Referring first to FIG. 1 of the drawings, the invention is shown as applied by way of example to a sodium-cooled fast nuclear reactor. The main, sodium-containing vessel 1 of the reactor is disposed in a vault 2 having a roof 3 penetrated by a rotatable shield 4. The reactor core 5, axial breeder regions 6 and radial breeder regions 7 are contained in a core vessel 8 carried by a diagrid 9 supported on brackets 10, shielding 11 being provided within the vessel 8. Sodium fills the vessels 1 and 8 and is pumped through the core and breeder regions to heat exchangers (not shown) within the vessel 1, secondary heat exchangers (not shown) outside the vessel 1 being employed for steam raising for supply to power-producing turbines. An argon gas blanket 12 is provided above the sodium in the vessels 1 and 8.

The rotatable shield 4 is cylindrical and mounted with its axis concentric with that of the core 5. It is employed for refuelling operations, enabling all core and breeder region fuel element positions to be serviced. The rotatable shield 4 also carries normal control rod operating mechanism (one of which is shown and designated 13) for operating for example 11 control rods, 6 for shutdown and 5 for control. There is provision for releasing these control and shut-down rods from their operating mechanisms to enable the shield 4 to be rotated; release is only effected when these rods are fully inserted in the core 5. The relative positions of the rods in the core may be for example as described in the said London Conference papers.

Each control rod (one designated 15 of which is shown projecting from the end of a housing 14 penetrating the shield 4 and carrying part of the control rod operating mechanism, see for example British Pat. No. 1,106,436) registers with a fixed, generally hexagonal section, tube (one being shown, designated 16) in the reactor core and axial breeder regions into which tube the control rod 15 is lowered for normal control and shut-down purposes. If, however, an incident such as a sodium vapour explosion consequent on the occurrence of sodium boiling due to a fault condition, leads to core distortion, it may not be possible to insert a rod 15 into the core. It is reasonable philosophy to postulate that the lower portion of the core, associated as it is with a rigid diagrid 9, is less likely to suffer distortion such as would prevent insertion of a shut-down element, and the equipment embodying the present invention operates on this assumption. To this end, say at least six of the eleven control rod tubes 16 have the parts 17 of such tubes 16 which extend beneath the core (FIGS. 1 and 2) adapted to contain apparatus (shown in more detail in FIG. 2) for causing insertion of a shut-down element 18 into the core particularly in fault conditions such that sufficient of the normal control rods 15 cannot be inserted into the core from above. Each tube part 17 is cylindrical and projects downwardly from the lower axial breeder region 6 and has a closure 19 penetrated by a pipe 20 which is perforated at 21 above the closure 19 but is solid beneath. Within the tube part 17 is a sleeve 22 mounted on the closure 19 and having a conical seating surface 23 at its upper end. The shut-down element 18 has sealing rings 24 on a complementary seating surface 25 for engagement with the surface 23. The element 18 also has a stem 26 which in the position shown in FIG. 2 (its non-operative, "ready" position) is accommodated within the perforate part of the pipe 20, the latter having a flared upper end 27 for reception of the stem 26. The element 18 is of sufficient height (it is shown fore-shortened in FIG. 2, in which lateral dimensions are about twelve times longitudinal dimensions) to register with the core region 5 when the element 18 is inserted thereinto.

Figure 2:
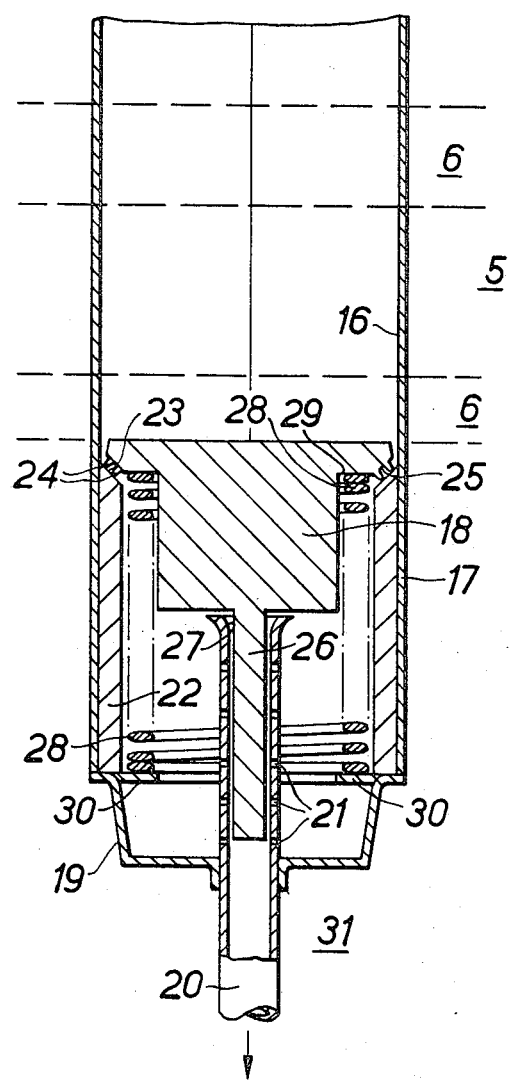
FIG. 2 is a similar view, drawn to an enlarged scale particularly in lateral dimension, illustrating a detail.

To insert the element 18 into the core region 5, a close-coiled helical compression spring 28, shown in FIG. 2 in its compressed or "cocked" state, is secured to a shoulder 29 of the element 18 at its upper end and is supported by a ledge 30 of the closure 19 at its lower end.

The spring 28 is held in its compressed state by pressure differential across the element 18. Above the element 18 will be sodium which occupies the core vessel 8 and at a pressure appropriate to the static head. Beneath the element 18, there is sodium at a considerably lower pressure brought about by means to be explained hereafter. Thus the element 18 is held down in sealing engagement on the sleeve 22 with a force greater than the load of the spring 28, which is thus effective to hold the spring inoperative until the pressure differential is lowered.

The pipe 20 is taken away laterally in the lower region 31 of the vessel 1 (FIG. 1) and then vertically upwardly when clear of the core vessel 8. Near but beneath the sodium surface the pipe 20 opens into an immersed suction pump 32 employing a radial impellor 33 driven by a shaft 34 which penetrates the roof 3 (a gland 35 being provided to prevent the escape of radioactive blanket gas and sodium vapour to the operating space 36 above the roof 3) and is driven by driving means 38 in the said operating space 36. Low pressure of sodium in the pipe 20 and thence in the portion of the tube part 17 beneath the element 18 is produced by driving the pump 32, and thus the required pressure differential across the element 18 is effected.

When it is desired to shut-down the reactor as in an emergency, the drive to the pump 32 is discontinued (as by interrupting the supply of electricity to the driving means 38 where this is an electric motor), or alternatively or in addition, by remote operation of a valve (not shown) allowing communication between the interior of pipe 20 and the sodium pool, at a position beneath the pump 32, the pressure of sodium in the pipe 20 and lower portion of the tube part 17 increases, and the compression spring 28 is released as soon as the pressure differential across the element 18 is reduced sufficiently.

The spring 28 is designed to insert the element 18 into a position where it registers with the core 5. With six devices operating, the likelihood of being able to insert two elements 18, which will be sufficient to shut down the reactor, is obviously extremely high.

Instead of having a pump 32 for each device, the pipes 20 can be led to a ring header which is served by two pumps 32 (for safety) and a standby pump 32. In this case, each pipe 20 has a constriction at its entry to the ring header, to prevent undue loss of low pressure should a pipe 20 fail.

Instead of a single spring 28, there may be two concentric coiled springs to ensure operation and possibly to provide against spring relaxation during service, should this prove to be a problem. However, the equipment within the tube part 17 can be arranged to be removable by a suitable grab operating through the tube 16, for inspection, maintenance and replacement as necessary.

In order to remove the element 18 from the core region when it is desired to restart the reactor, the control rod 15 normally operating in the tube 16 can be employed, where core distortion has not taken place, to force the element 18 down on its seat and at the same time recock the spring 28. There may be a circumstance where the emergency shut-down equipment needs to be operated with a control rod 15 partially inserted in the core. To this end, the respective control rod 15 is provided with a cup 39 at its lower end, the cup 39 being adapted to receive the upper end of an element 18 therewithin.

It is unlikely that the sealing engagement between absorber element 18 and sleeve 22 will remain perfect during reactor operation, but a small amount of leakage past the seal from the high pressure side to the low pressure side can be permitted without imparing the efficient operation of the shut-down equipment. Furthermore, in order to promote a degree of flow of sodium coolant upwardly along the tube 16 to cool the latter, it is probably desirable to provide a by-pass or bleed allowing sodium in the diagrid region to enter the tubes 16 above the level of the absorber elements 18.

An example of typical parameters for a fast nuclear reactor of the said P.F.R. type is:

Height of core region 5—3 ft.
Height of upper axial breeder region 6—1½ ft.
Height of lower axial breeder region 6—¾ ft.
Height of element 18—3 ft.
Weight of element 18—100 lbs.
Force exerted by compressed spring 28—200 lbs.
Tube 16 hexagonal, tube part 17 cylindrical, across flats and internal diameter respectively—5.3"
Effective surface area of element 18 on which low pressure sodium operates—20 sq. in.
Suction pressure—2 p.s.i.a.
Pressure differential—20 p.s.i.
∴Hold-down force is 400 lbs. which leaves 300 lbs. as a safety margin.

We claim:

1. Secondary shut down equipment in combination with a liquid metal cooled nuclear reactor comprising a core structure having a central active region, the core structure being supported within a vessel on a bottom support structure, the upper end of the vessel being closed by a shield located above the core structure, there being a plurality of control rod tubes extending above, through and below the central active region of the core structure, normal control and shut down of the reactor being effected by rigid control rods present in the parts of the control rod tubes extending above the active region of the core structure, means being provided for moving the control rods axially in the control rod tubes into and out of the active region of the core structure, said secondary shut down equipment comprising a rigid absorber element in the lower end of each control rod tube below the active region of the core structure, means for moving the absorber element axially from the lower end of the control rod tube into the active region of the core structure comprising compression spring means disposed between a transverse abutment in the lower end of the control rod tube and a transverse abutment on the absorber element, and releasable holding means adapted to retain the absorber element in the lower end of the control rod tube with the compression spring in a compressed condition.

2. Shut down equipment for a liquid metal cooled nuclear reactor as claimed in claim 1 wherein the releasable holding means for the absorber element comprises a flange on the absorber element sealing with the bore of the lower part of the control rod tube containing the absorber element and pumping means connected by pipework with the lower end of the control rod tube below the flange whereby a lower pressure can be maintained in liquid metal coolant in the control rod tube below the flange than the normal pressure existing in liquid metal coolant in the control rod tube above the flange so holding the absorber element down in the lower end of the control rod tube against the action of the compression spring by the differential pressure existing across the flange, equalization of the pressure acting across the flange by rendering said pumping means inactive allowing the compression spring to expand and insert the control element from the lower end of the control rod tube into the part of the control rod tube within the active region of the core structure.

References Cited
UNITED STATES PATENTS

| | | | |
|---|---|---|---|
| 3,139,384 | 6/1964 | Filloleau et al. | 176—36 |
| 3,342,688 | 9/1967 | Challender | 176—36 |
| 3,365,368 | 1/1968 | Fray | 176—35 |

FOREIGN PATENTS

| | | | |
|---|---|---|---|
| 998,933 | 7/1965 | Great Britain | 176—35 |

CARL D. QUARFORTH, Primary Examiner

H. E. BEHREND, Assistant Examiner

U.S. Cl. X.R.

176—36